US008234688B2

(12) United States Patent
Grandison et al.

(10) Patent No.: US 8,234,688 B2
(45) Date of Patent: Jul. 31, 2012

(54) MANAGING PRIVACY SETTINGS FOR A SOCIAL NETWORK

(75) Inventors: Tyrone W. A. Grandison, San Jose, CA (US); Sherry Guo, Fremont, CA (US); Kun Liu, San Jose, CA (US); Eugene M Maximilien, San Jose, CA (US); Dwayne L Richardson, San Francisco, CA (US); Tony Sun, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 12/418,511

(22) Filed: Apr. 3, 2009

(65) Prior Publication Data
US 2010/0257577 A1 Oct. 7, 2010

(51) Int. Cl.
*H04L 29/06* (2006.01)
(52) U.S. Cl. ............. 726/1; 705/319; 715/741; 715/743
(58) Field of Classification Search ........ 726/1; 705/319; 715/741, 743, 744
See application file for complete search history.

(56) References Cited

U.S. PATENT DOCUMENTS

| 6,243,613 | B1 * | 6/2001 | Desiraju et al. ............ 700/104 |
| 8,026,918 | B1 * | 9/2011 | Murphy .................... 345/473 |
| 2002/0104015 | A1 | 8/2002 | Barzilai et al. |
| 2004/0093224 | A1 * | 5/2004 | Vanska et al. .................. 705/1 |
| 2005/0256866 | A1 | 11/2005 | Lu et al. |
| 2006/0123462 | A1 | 6/2006 | Lunt et al. |
| 2006/0173963 | A1 | 8/2006 | Roseway et al. |
| 2006/0248573 | A1 | 11/2006 | Pannu et al. |
| 2006/0248584 | A1 | 11/2006 | Kelly et al. |
| 2006/0294134 | A1 | 12/2006 | Berkhim et al. |
| 2007/0005695 | A1 | 1/2007 | Chen et al. |
| 2007/0271379 | A1 | 11/2007 | Carlton et al. |
| 2007/0283171 | A1 | 12/2007 | Breslin et al. |
| 2008/0005778 | A1 | 1/2008 | Chen et al. |

(Continued)

FOREIGN PATENT DOCUMENTS
WO WO2006115919 A2 11/2006
(Continued)

OTHER PUBLICATIONS

Liu et al.—A Framegork for Computing the Privacy Scores of Users in Online Social Networks. ACM Transactions on Knowledge Discovery from Data, vol. 5, No. 1, Article 6. Dec. 2010. http://dl.acm.org/citation.cfm?id=1870102.*

(Continued)

*Primary Examiner* — Kaveh Abrishamkar
*Assistant Examiner* — Ngoc D Nguyen
(74) *Attorney, Agent, or Firm* — Kali Law Group, P.C.

(57) ABSTRACT

Methods for managing privacy settings for a social network using an electronic computing device are presented including: causing the electronic computing device to receive a triggering event on the social network; and causing the electronic computing device to determine a number of privacy indices in response to the triggering event, where the number of privacy indices correspond with at least one target user, where the number of privacy indices are normalized from a summation of a number of privacy scores, where the number of privacy scores are each derived from a sum of attribute scores, and where the sum of attribute scores are each derived from a weighted sensitivity value of an attribute and a user relationship distance value of a user and the target user.

18 Claims, 4 Drawing Sheets

U.S. PATENT DOCUMENTS

| | | | |
|---|---|---|---|
| 2008/0046976 | A1 | 2/2008 | Zuckerberg |
| 2008/0104679 | A1 | 5/2008 | Craig |
| 2008/0155534 | A1 | 6/2008 | Boss et al. |
| 2008/0189768 | A1 | 8/2008 | Callahan et al. |
| 2008/0235168 | A1* | 9/2008 | Chan et al. ............ 706/14 |
| 2010/0024042 | A1* | 1/2010 | Motahari et al. ............ 726/26 |

FOREIGN PATENT DOCUMENTS

| | | | |
|---|---|---|---|
| WO | WO 2007015184 A2 * | 2/2007 | |
| WO | 2009-033182 A1 | 3/2009 | |

OTHER PUBLICATIONS

Barnes, "A privacy paradox: Social networking in the United States", First Monday vol. 11, No. 9, (Sep. 2006) 12 pp.

PCT Int'l Search Report and Written Opinion of the ISA (EPO), mailed Dec. 6, 2010, in case No. PCT/EP2010/055854.

Adams, "A Classification for Privacy Techniques", (2006) U of Ottawa Law & Tech Jml., 3:1, pp. 35-52.

DiGioia, et al., "Social Navigation as a Model for Usable Security", (Jul. 2005) Symp. on Usable Priv & Sec, Pittsburgh, PA, USA, 6 pp.

Gross, et al., "Information Revelation and Privacy in Online Social Networks (The Facebook Case)", ACM WPES Nov. 2005 (pre-proceedings version), Alexandria, VA, USA, 11 pp.

Lipford, et al., "Understanding Privacy Settings in Facebook with an Audience View", Charlotte NC USA, 5 pp.

Liu, et al., "Privacy-Preserving Data Analysis on Graphs and Social Networks", Ch. 1, 22 pp.

Lu, et al., "Trust-Based Privacy Preservation for Peer-to-peer Data Sharing", West Lafayette, IN, USA, Purdue Univ—Dept of Computer Sciences, 7 pp.

Myers, et al., "Protecting Privacy Using the Decentralized Label Model", (Oct. 2000) ACM Trans. on Software Eng. & Methodol., vol. 9/No. 4, pp. 410-442.

Howe, "The Problem with Privacy Policies & 'Industry Self-Regulation'", 19 pp., http://www.spywarewarrior.com/uiuc/priv-pol.htm.

Grandison et al., "Towards Privacy Propagation in the Social Web", IBM Almaden Research Center, 2 pp.

Zhou et al., "Preserving Privacy in Social Networks Against Neighborhood Attacks", School of Computing Science, Simon Fraser Univ., Burnaby, BC (CA) 10 pp.

Liu, et al., "Privacy-Preserving Data Analysis on Graphs and Social Networks", Ch. 1, 22 pp., CRC Press 2008.

Lu, et al., "Trust-Based Privacy Preservation for Peer-to-peer Data Sharing", West Lafayette, IN, USA, Purdue Univ—Dept of Computer Sciences, 7 pp., IEEE May 2006.

Myers, et al., "Protecting Privacy Using the Decentralized Label Model", (Oct 2000) ACM Trans. on Software Eng. & Methodol., vol. 9/No. 4, pp. 410-42.

Howe, "The Problem with Privacy Policies & 'Industry Self-Regulation'", 19 pp., http://www.spywarewarrior.com/uiuc/priv-pol.htm, Howes 2000.

Walter, et al., "A Model of a Trust-based Recommendation System on a Social Network", JAAMAS (Sep. 2007), 22 pp.

Grandison et al., "Towards Privacy Propagation in the Social Web", IBM Almaden Research Center, 2 pp., W2SP May 2008.

Wang et al., "Privacy Protection in Social Network Data Disclosure Based on Granular Computing", (Jul. 2006), IEEE Int'l Conf. on Fuzzy Systems, Vancouver, BC, (CA), pp. 997-1003.

Zhou et al., "Preserving Privacy in Social Networks Against Neighborhood Attacks", School of Computing Science, Simon Fraser Univ., Burnaby, BC (CA) 10 pp., IEEE 2008.

* cited by examiner

MANAGING PRIVACY SETTINGS FOR A SOCIAL NETWORK

BACKGROUND

As social networking becomes more prevalent across the Internet, more user information is potentially exposed across a wide variety of sites. While social networking applications have empowered users to share friends, music, and numerous aspects of their personalities, they have also raised numerous privacy concerns. Many users may wish to freely share information between close associates, but would also prefer to keep sensitive personal information safe from other third parties whose interest in such information may not be in a user's best interest.

Most social networks utilize varying degrees of privacy protection. User logon and password authentication are the most common. However, this first level of protection only ensures that the person having the password has the right to be on the network. One approach utilized to increase security in some social networks is to establish preferences that correspond with privacy settings. However, this coarse granularity in privacy settings may not adequately protect sensitive information. For example, preferences may be established for a social network in which a user has close friends as well as casual acquaintances. In those cases, utilizing a preference model may be too broad to protect an individual user's privacy interests.

Another issue confronting privacy is that some privacy settings schemes are simply too complex for users to easily navigate. In those examples, schemes requiring multiple levels of security may result in users ignoring settings altogether or inadvertently exposing sensitive information. As such, managing privacy settings for a social network are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for managing privacy settings for a social network using an electronic computing device are presented including: causing the electronic computing device to receive a triggering event on the social network; and causing the electronic computing device to determine a number of privacy indices in response to the triggering event, where the number of privacy indices correspond with at least one target user, where the number of privacy indices are normalized from a summation of a number of privacy scores, where the number of privacy scores are each derived from a sum of attribute scores, and where the sum of attribute scores are each derived from a weighted sensitivity value of an attribute and a user relationship distance value of a user and the target user. In some embodiments, methods further include: causing the electronic computing device to calculate a recommended privacy setting for the user based on the number of privacy indices, where the recommended privacy setting represents a highest privacy index of the number of privacy indices, where the highest privacy index indicates a most secure privacy setting; causing the electronic computing device to display a current privacy setting for the user; and causing the electronic computing device to display the recommended privacy setting for the user. In some embodiments, methods further include: causing the electronic computing device to implement the recommended privacy setting if the user desires a higher privacy setting; and causing the electronic computing device to maintain the current privacy setting if the user does not desire the higher privacy setting. In some embodiments, methods are presented where the triggering event may include: the user creates a group, the user joins the group, the user leaves the group, the group adds a group member, the group changes status, the user creates a network, the user joins the network, the user leaves the network, the network adds a network member, the network changes status, the user adds a friend, the user removes the friend, the friend adds the user, the friend removes the user, the user initiates an account, the user adds an application, the user removes an application, and a periodic timer elapses. In some embodiments, methods are presented where the attribute may include: a personal data attribute, a contact data attribute, an education data attribute, a business data attribute, a hobby data attribute, an interest data attribute, and a user relationship data attribute. In some embodiments, methods are presented where each attribute is assigned the weighted sensitivity value based a determination of a level of importance to the user. In some embodiments, methods are presented where the user relationship distance value is defined by a relationship including: a close friend relationship, a friend relationship, a friend of a friend relationship, an acquaintance relationship, a group relationship, and a network relationship. In some embodiments, methods are presented that further include modifying the current privacy setting to add a subset of the recommended privacy setting.

In other embodiments, computing device program products for managing privacy settings for a social network using a computing device are presented, the computing device program product including: a computer readable medium; programmatic instructions for receiving a triggering event; and programmatic instructions for determining a number of privacy indices in response to the triggering event, where the number of privacy indices correspond with at least one target user, where the number of privacy indices are normalized from a summation of a number of privacy scores, where the number of privacy scores are each derived from a sum of attribute scores, and where the sum of attribute scores are each derived from a weighted sensitivity value of an attribute and a user relationship distance value of a user and the target user. In some embodiments, computer device program products further include programmatic instructions for calculating a recommended privacy setting for the user based on the number of privacy indices, where the recommended privacy setting represents a highest privacy index of the number of privacy indices, where the highest privacy index indicates a most secure privacy setting; programmatic instructions for displaying a current privacy setting for the user; programmatic instructions for displaying the recommended privacy setting for the user; programmatic instructions for implementing the recommended privacy setting if the user desires a higher privacy setting; and programmatic instructions for maintaining the current privacy setting if the user does not desire the higher privacy setting.

In other embodiments, privacy managers having a privacy recommendation component for managing privacy settings for a social network are presented, the privacy managers including: a privacy score calculator module for determining a number of privacy indices in response to the triggering event; a privacy enforcer module for managing conflicts associated with accepting the privacy recommendation; a privacy model module for managing a user relationship, the user relationship utilized for defining a user relationship distance value; and a privacy elections module for designating the user relationship between a user and a target. In some embodiments privacy managers are presented where the privacy manager is configured to communicate with a models component, the models component configured to display the privacy settings within the social network, and where the privacy manager is further configured to communicate with a number of controllers, the controllers configured for interfacing the privacy manager with a user interface and the models component. In some embodiments, the privacy manager is further configured to access a repository, the repository configured for storing non-transient data associated with the privacy manager. In some embodiments, the privacy manager is enabled over an application server, where the application server is in electronic communication with the social network.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
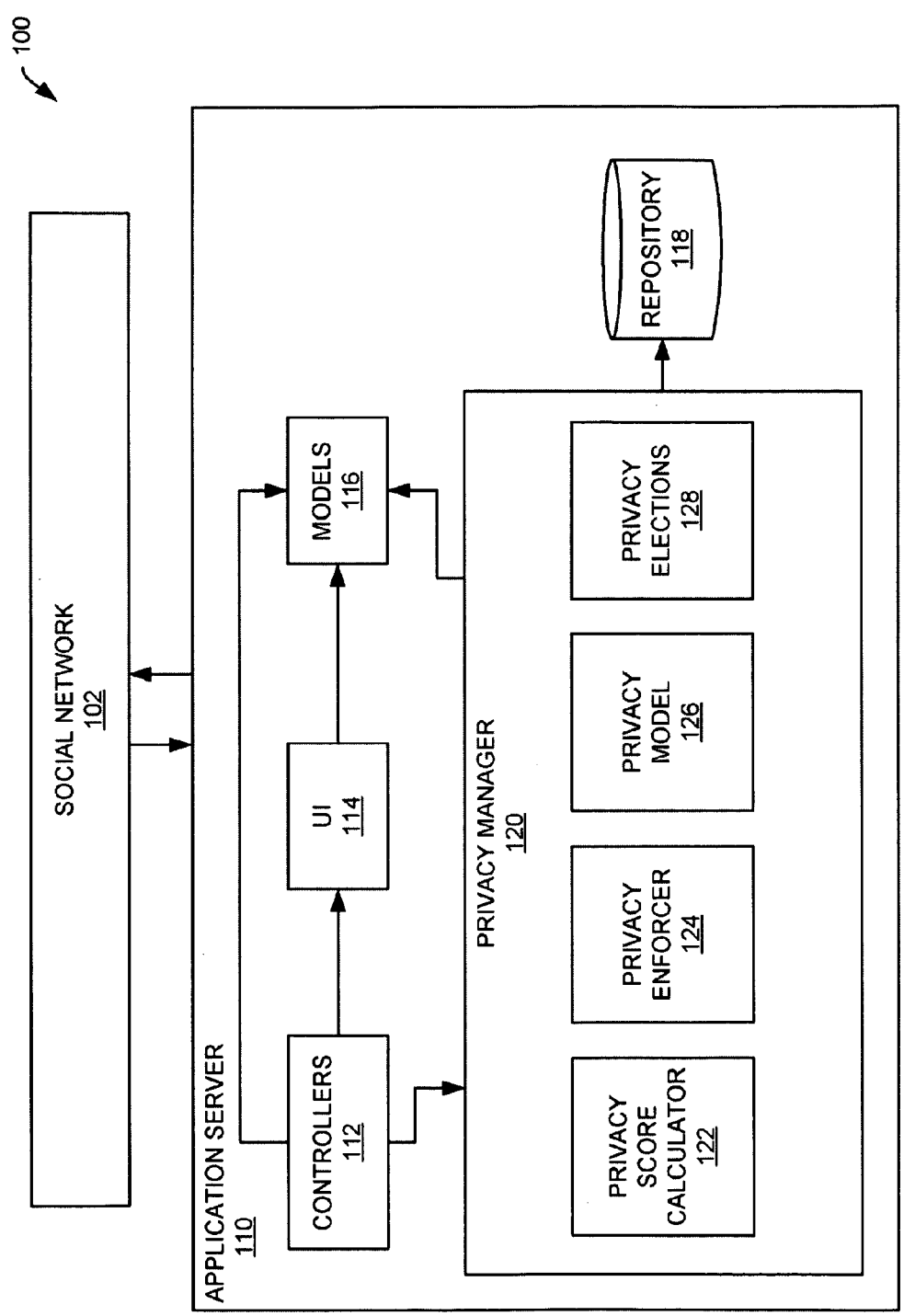
FIG. 1 is an illustrative representation of a system for managing privacy settings for a social network in accordance with embodiments of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks Referring now to the Figures, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an illustrative representation of a system 100 for managing privacy settings for a social network in accordance with embodiments of the present invention. As illustrated, social network 102 is in communication with application server 110. As may be appreciated, social network 102 may be in communication with application server 110 over a local network, a remote network, a wide area network, or any other network known in the art without limitation and without departing from the present invention. In embodiments, social networks may include without limitation: Advogato, AMIE STREET™, Anobil, ASMALLWORLD™, Athlinks, Avatars United, BADOO™, Bahi, BEBO™, BIP™, BLACKPLANET.COM™, BOOMJ.COM™, Broadcaster.com, BUZZNET™, CAFEMOM™, Cake Financial Care2 (Notice of Allowance 9/08 for Mark CARE2), CLASSMATES.COM™, Cloob, COLLEGE TONIGHT™, CouchSurfing, CozyCot, DEVIANTART™, DontStayIn, Elftown, Eons.com, Espinthebottle, Experience Project, FACEPARTY™, FACES.COM™, Fetlife, FLICKR™, FLIXSTER™, FOTOLOG™, Friends United, FRIENDSTER™, Frühstückstreff, FUBAR™, GAIA ONLINE™, GAMERDNA™, GATHER™, Geni.com, gibLink.com, Goodreads, GOSSIPREPORT.COM™, Grono.net, Haboo, HI5™, HORSELAND™, THE HOSPITALITY CLUB™, HYVES™, IMEEM™, IRC, Cafeteria, ircloop, ITalki, ITSMY™, iWiW, JAIKU™, JammerDirect, kaioo, KAIXIN™, Last.fm™, LibraryThing, LIFEKNOT™, LINKEDIN™, LIVEJOURNAL™, Livemocha, LUNARSTORM™, MEETin, MEETUP™, MIGENTE.COM™, MIXI™, mobikade, MOCOSPACE™, MOG™, MULTIPLY™, Muxlim, MYCHURCH™, MYHERITAGE™, MyLOL, MYYEARBOOK™, Nasza-klasa.p, Netlog, Nettby, NEXOPIA™, NING™, Odnoklassniki.ru, OKCUPID™, OneWorldTV, OUTeverywhere, Passportstamp, Pingsta, PLAXO™, PLAYAHEAD™, Playbooy U, Plurk, quarterlife, Ravelry, ResearchGate, REUNION.COM™, Reverbnation, RYZE™, scispace.net, SHELFARI™, SKYROCK™, Sonico.com, SOUNDPEDIA™, Spoke, STICKAM™, Student.com, StudiVZ, Tagged.com, TALTOPIA™, TravBuddy.com, Travellerspoint.com, TRIBE.NET™, Trombi.com, tuenti.com, TWITTER™, V Kontakte, Vampirefreaks, Viadeo, VOX™, WASABI™, WAYN, WebBiographies, Windows Live, Spaces, WIS.DM™, WISEREARTH™, XANGA™, Xiaonei, XING™, X13™, YELP™, and Youmeo.

Application server 110 may be configured with a number of components for enabling embodiments described herein. As illustrated, application server 110 may include controllers 112 for enabling interactions between privacy manager 120, user interface (UI) 114, and models component 116. UI 114 and models component 116 may be configured to cooperatively and graphically display privacy settings as determined by privacy manager 120 on an electronic computing device. A user interface embodiment, such as may be displayed on a computing device, may be configured to display current and recommended privacy settings. As such, a user may, in embodiments, utilize UI 114 to select either current privacy settings, recommended privacy settings. In addition, UI 114 may be configured to accept custom user privacy settings in some embodiments. Displaying privacy settings on an electronic computing device will be discussed in further detail below for FIG. 4. Models component 116 may be configured to manage visualization of any discretionary privacy settings available to a user for modification utilizing embodiments described herein.

Application server 110 further includes privacy manager 120. Privacy manager 120 may include several modules for enabling embodiments described herein. Privacy score calculator module 122 may be configured to determine a number of privacy indices in response to some triggering event associated with social network 102. Furthermore, privacy score calculator module 122 may be configured to implement any range of privacy score calculations. Privacy scores indicate a level of privacy or security. As utilized herein, a privacy score is an aggregation of all attribute scores of a user or target. In embodiments, a high privacy score is indicative of a more secure privacy setting. Likewise, in embodiments, a low privacy score is indicative of a weaker privacy setting. Privacy scores will be discussed in further detail below for FIG. 2. Privacy score calculator module 122 may be further configured to calculate a privacy index. As utilized herein, privacy indices are normalized from a summation of privacy scores of a user or target. In embodiments, a high privacy index is indicative of a more secure privacy setting. Likewise, in embodiments, a low privacy index is indicative of a weaker privacy setting. Privacy indices will be discussed in further detail below for FIG. 2.

Privacy manager 120 may further include privacy enforcer module 124. In embodiments, privacy manager 120 may be configured to manage conflicts associated with accepting privacy recommendations. As may be appreciated, in utilizing embodiments described herein, conflicts may arise in managing privacy settings. For example, in a preferred embodiment, a conflict will always be resolved to a more secure privacy setting. However, in other embodiments, conflicts may be resolved in any arbitrary fashion without limitation. Privacy manager 120 may further include privacy model module 126. In embodiments privacy model module 126 may be configured to manage a user relationship. A user relationship may be utilized to determine a user relationship distance value, which may be characterized as a quantification of trust between a user and target. In some embodiments, user relationships may include without limitation: a close friend relationship, a friend relationship, a friend of a friend relationship, an acquaintance relationship, a group relationship, and a network relationship. Each of these relationships defines a level of trust. For example, a close friend relationship may be more "trustworthy" than a network relationship. Thus, a user having a close friend relationship with a first target might logically be more inclined to share more sensitive information with the first target than with a second target where the second target has a network relationship with the user.

Privacy manager 120 may further include privacy elections module 128. In embodiments, privacy elections module 128 may be configured to designate a user relationship between a user and a target. As noted above, a user relationship may be utilized to determine a user relationship distance value, which may be characterized as a quantification of trust between a user and target. Privacy elections module 128 may be configured to establish what level of relationship is appropriate. In some embodiments, privacy elections module 128 may be configured to receive input from a user. In other embodiments, privacy elections module 128 may be configured to receive input from social network 102. Privacy manager 120 may be further configured to access repository 118. Repository 118 may be configured to store non-transient data associated with privacy manager 120. In some embodiments, repository 118 may include a database that is accessible via a database management system (DBMS). In other embodiments, repository 118 may include a hardware storage medium. In still other embodiments, repository 118 may be located locally or remotely and may be accessible through any method known in the art without limitation.

Figure 2:
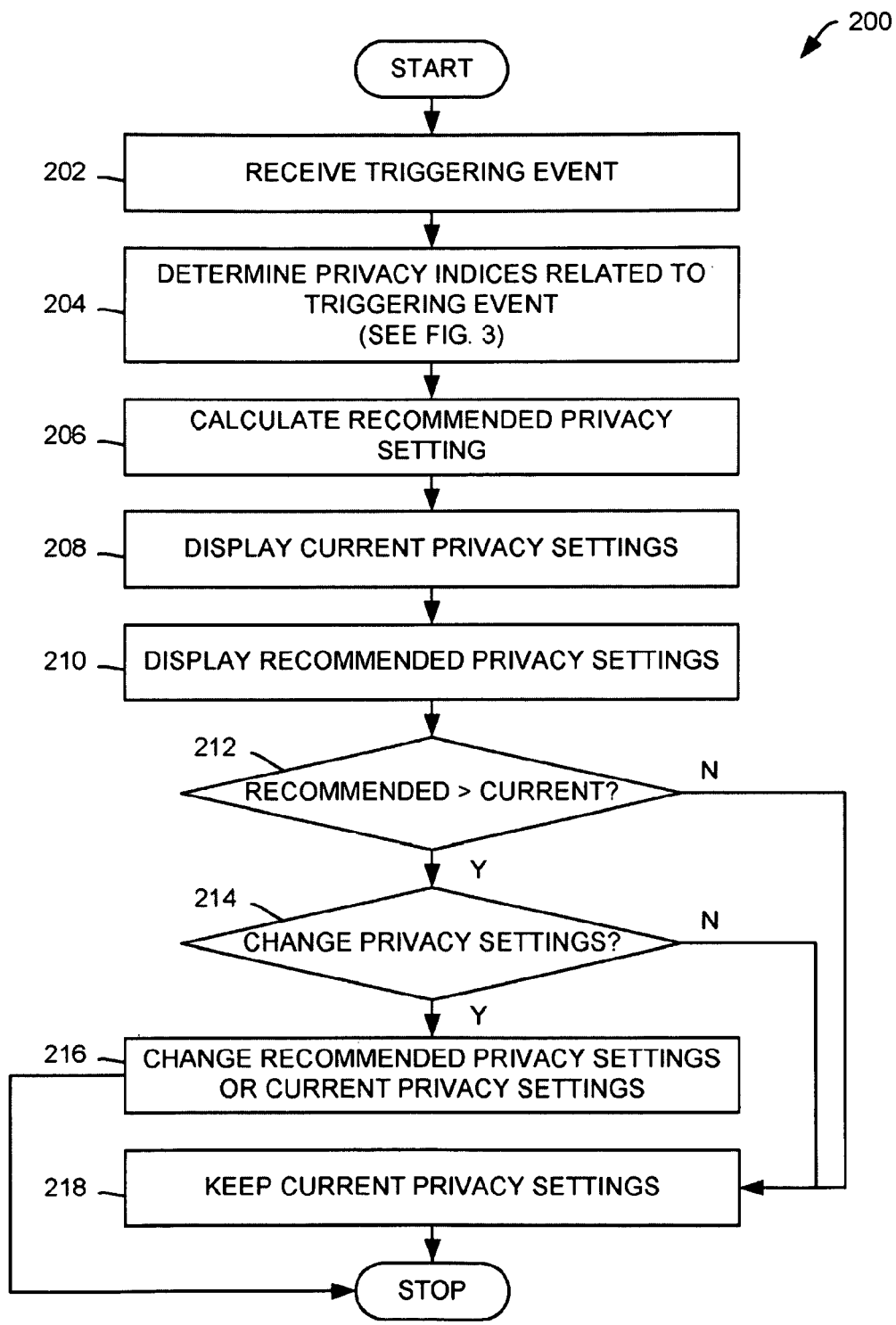
FIG. 2 is an illustrative flowchart of methods for managing privacy settings for a social network in accordance with embodiments of the present invention.

FIG. 2 is an illustrative flowchart 200 of methods for managing privacy settings for a social network in accordance with embodiments of the present invention. At a first step 202, the method receives a triggering event. A triggering event as utilized herein is merely an event that initiates methods described herein. In embodiments, triggering events may include without limitation: a user creates a group, a user joins a group, a user leaves a group, a group adds a group member, a group changes status, a user creates a network, a user joins a network, a user leaves a network, a network adds a network member, a network changes status, a user adds a friend, a user removes a friend, a friend adds a user, a friend removes a user, a user initiates an account, a user adds an application, a user removes an application, and a periodic timer elapses. In embodiments, periodic timers may be set for any range or dependency without limitation. In addition, in embodiments, triggering events may be processed individually upon event occurrence, processed by batch, or processed randomly without limitation. Triggering events may be processed, in some embodiments, in a manner as to limit network traffic caused by processing methods described herein.

At a next step 204, the method determines privacy indices related to a triggering event. As noted above, privacy indices are normalized from a summation of privacy scores of a user or target. In embodiments, a high privacy index is indicative of a more secure privacy setting. Likewise, in embodiments, a low privacy index is indicative of a weaker privacy setting. Determination of privacy indices will be discussed in further detail below for FIG. 3. At a next step 206, the method calculates recommended privacy settings. Recommended privacy settings are based on privacy indices that are determined in a previous step. In embodiments, a more secure privacy setting is calculated from a high privacy index. Likewise, in embodiments, a weaker privacy setting is calculated from a low privacy index. In a preferred embodiment, a recommended privacy setting is always a more secure (or higher) privacy setting. However, recommended privacy settings may be calculated from other privacy indices having weaker privacy settings in other embodiments without limitation.

At next steps 208 and 210, the method displays current privacy settings and recommended privacy settings. As noted above for FIG. 1, a UI 114 may be configured to display current privacy settings on an electronic computing device. As such, in embodiments, UI 114 may be configured to display current privacy settings, recommended privacy settings, or both current privacy settings and recommended settings. Displaying privacy settings on an electronic computing device will be discussed in further detail below for FIG. 4. Returning to FIG. 2, at a next step 212, the method determines whether recommended privacy settings are greater (or higher) than current privacy settings. If the method determines as a step 212 that recommended privacy settings are not greater than current privacy settings, the method continues to a step 218 to keep optionally current privacy settings. In some embodiments, when recommended privacy settings are not greater than current privacy settings, then no recommendation is made.

If the method determines as a step 212 that recommended privacy settings are greater than current privacy settings, the method continues to a step 214 to determine whether to optionally change privacy settings. If the method determines at a step 214 not to change privacy settings, the method continues to a step 218 to keep current privacy settings. If the method determines at a step 214 to change privacy settings, the method continues to a step 216 to change current privacy settings to recommended privacy settings. In some embodiments, changing to higher recommended privacy settings may be enforced automatically. In other embodiments, a user may choose whether or not to select recommended privacy settings. In still other embodiments, a user may change current privacy settings to include a subset of recommended privacy settings resulting in higher or lower privacy settings independent of recommended privacy settings. The method then ends.

Figure 3:
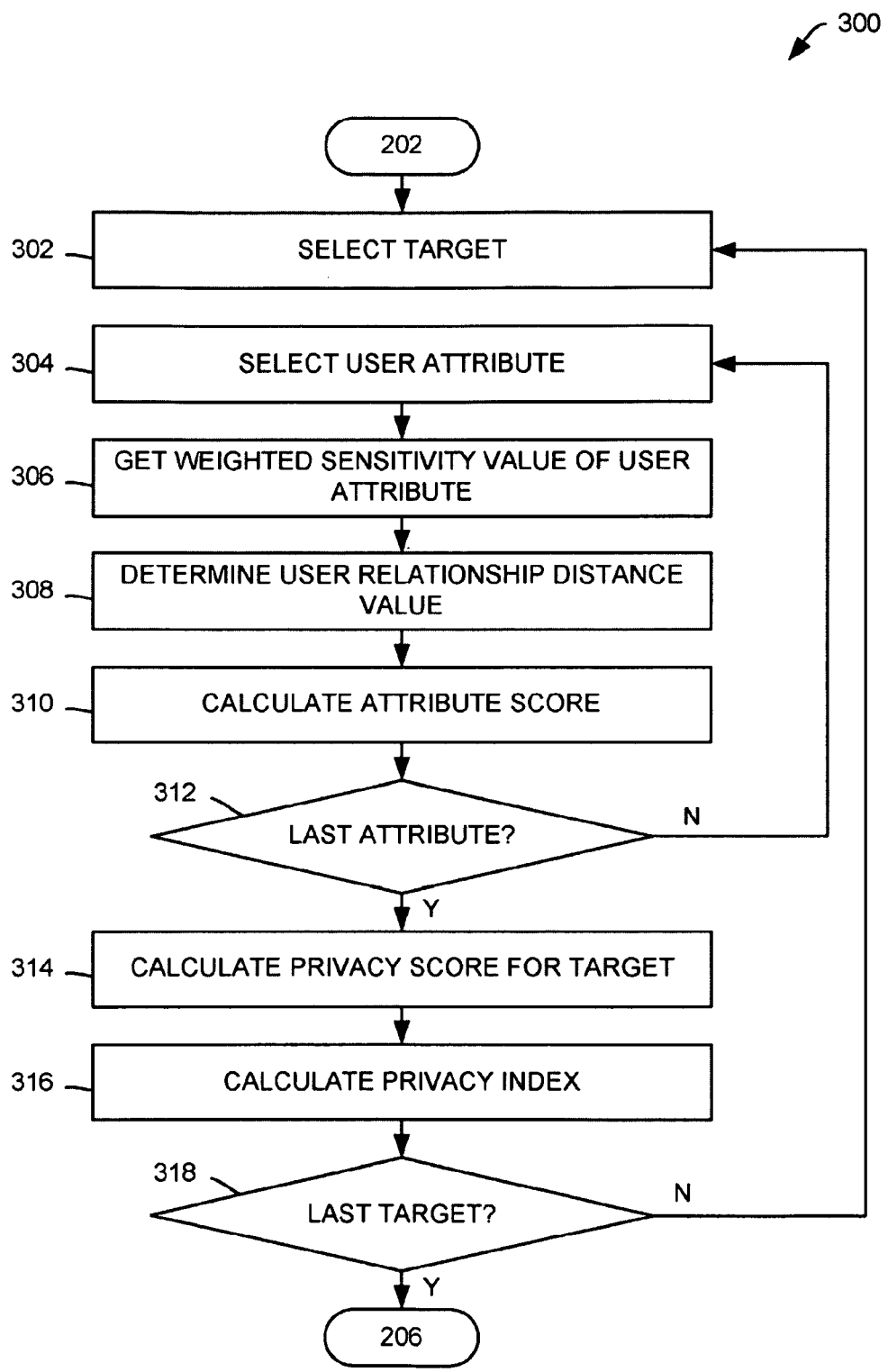
FIG. 3 is an illustrative flowchart of methods for calculating an privacy index in accordance with embodiments of the present invention.

FIG. 3 is an illustrative flowchart 300 of methods for calculating a privacy index in accordance with embodiments of the present invention. In particular, FIG. 3 is an illustrative flowchart 300 of a step 204 (see FIG. 2). At a first step 302, a target is selected. A target, as utilized herein, is another user under inspection. In embodiments, a target may be a member of a group or network without limitation. At a next step 304, a user attribute is selected. A user attribute is some characteristic defined by a model in a social network. For example, if a model on a social network is contact information, then one attribute might be a last name. In embodiments, models may have any number of attributes and social networks may have any number and type of models. Furthermore, attributes may be shared based on a user's preferences as embodied in a privacy setting. Thus, a user not wishing to share any contact information may be denoted as having a high privacy index, whereas a user sharing all contact information may be denoted as having a low privacy index. In embodiments, attributes may include without limitation: a personal data attribute, a contact data attribute, an education data attribute, a business data attribute, a hobby data attribute, an interest data attribute, and a user relationship data attribute.

At a next step 306, the method gets a weighted sensitivity value of a user attribute. A weighted sensitivity value of a user attribute is a numeric representation of the sensitivity of the attribute to a user. For example, an attribute such as social security number may have a high weighted sensitivity value representing highly sensitive information where another attribute such as first name may have a low weighted sensitivity value representing non-sensitive information. Weighted sensitivity values may be gathered from any source without limitation without departing from the present invention. At a next step 308, the method determines a user relationship distance value, which is a numeric representation of the distance between a user and a target. As may be appreciated, a close relationship generally equates with more trust while a further relationship generally equates with less trust. In embodiments, relationship may include without limitation: a close friend relationship, a friend relationship, a friend of a friend relationship, an acquaintance relationship, a group relationship, and a network relationship.

At a next step 310, the method calculates an attribute score. An attribute score is calculated from a weighted sensitivity value and a relationship distance value. In a preferred embodiment, the weighted sensitivity value is multiplied by the distance value to generate an attribute score. In other embodiments, an arithmetic value is generated. At a next step 312, the method determines whether an attribute under inspection is a last attribute. If the method determines at a step 312 that the attribute under inspection is not a last attribute, the method continues to a step 304 to select another attribute for inspection. In this manner the method iterates through all attributes. If the method determines at a step 312 that the attribute under inspection is a last attribute, the method continues to a step 314 to calculate a privacy score for the target. As may be appreciated, a privacy score, as utilized herein, incorporates both a relative sensitivity value of the attribute and a relationship component with a target under inspection. In embodiments, a privacy score is the sum of all attribute scores for a particular target. At a next step 316, the method calculates a privacy index. In embodiments, a privacy index is a privacy score normalized to a range of approximately 0 to 100. In other embodiments, a privacy index is a privacy score normalized to a range of approximately 0 to 10. As such, a lower index indicates a lower risk of privacy exposure whereas a higher index indicates a higher risk of privacy exposure. At a next step 318, the method determines whether a target under inspection is a last target. If the method determines at a step 318 that the target under inspection is not the last target, the method continues to a step 302 to select another target. In this manner, the method iterates until all members (or targets) of a group are inspected. If the method determines at a step 318 that the target under inspection is the last target, the method continues to a step 206.

Figure 4:
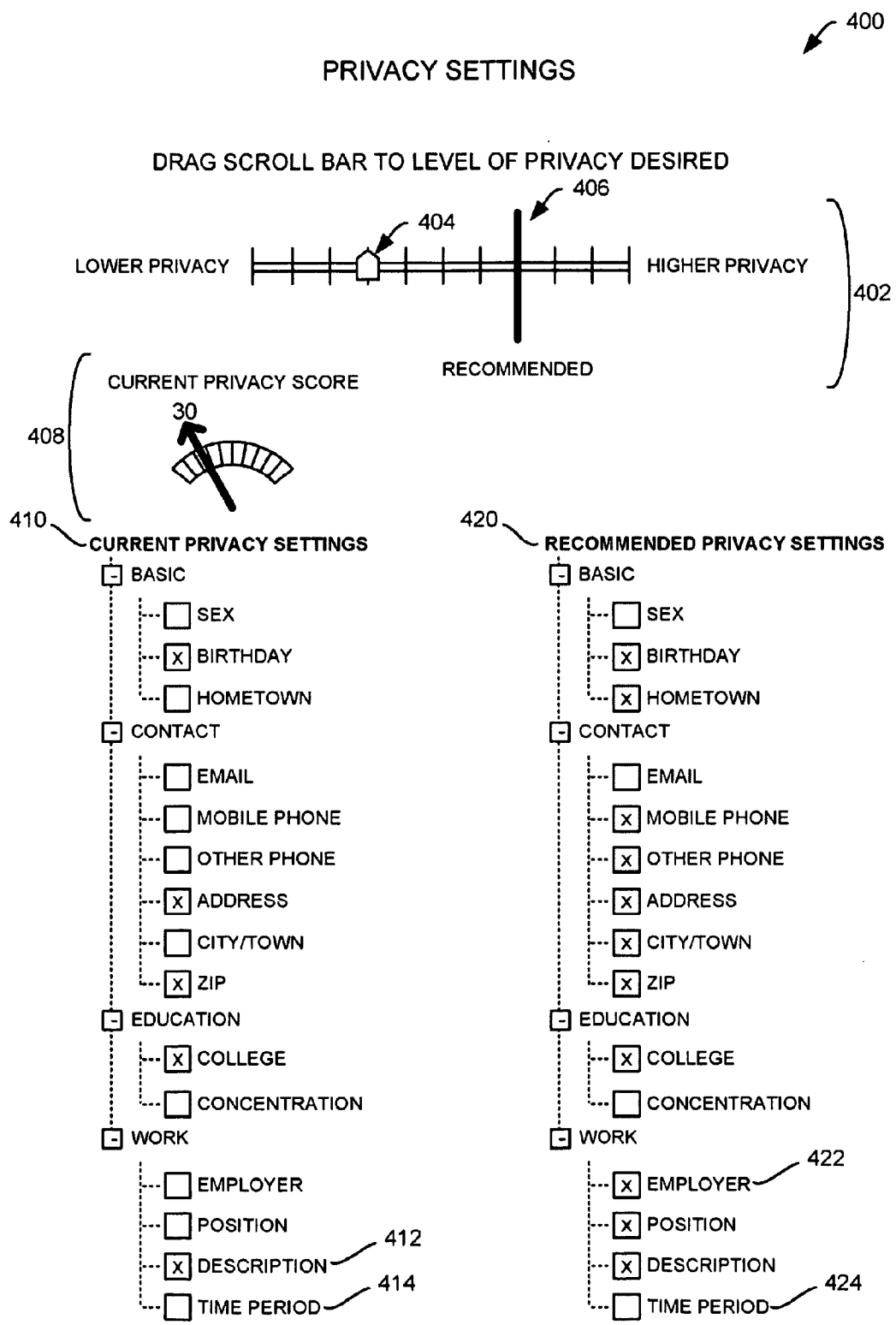
FIG. 4 is an illustrative representation of a graphical user interface utilized for managing privacy settings for a social network in accordance with embodiments of the present invention.

FIG. 4 is an illustrative representation of a graphical user interface (UI) 400 utilized for managing privacy settings for a social network in accordance with embodiments of the present invention. In particular, FIG. 4 is an illustrative embodiment of UI 114 (FIG. 1). It is noted that this illustration is presented for clarity in understanding embodiments of the present invention and should not be construed as limiting with respect to layout, design, color, or content. Indeed, any number of UIs may be presented which may be enabled for embodiments described herein. As illustrated, UI 400 may include privacy bar 402. Privacy bar 402 may be configured to indicate privacy settings relative to a continuum. In some embodiments, scroll bar 404 may be dragged only to recommended settings indicator 406. Upon dragging scroll bar 404 to recommended settings indicator 406, a user's privacy settings will be changed to reflect the recommended settings.

In some embodiments, UI 400 may include privacy graph 408. Privacy graph 408 may be utilized to easily indicate relative strength of privacy settings. In this example, privacy graph 408 indicates a privacy index of 30 out of 100, which is on a lower end of privacy indices. As noted above, in embodiments, a privacy index is a privacy score normalized to a range of approximately 0 to 100. In other embodiments, a privacy index is a privacy score normalized to a range of approximately 0 to 10. Privacy graph 408 may be further configured, in some embodiments, with color indicators indicating levels of risk. In one embodiment, red indicates a high level of risk and green indicates a low level of risk.

Further illustrated are current privacy settings 410 and recommended privacy settings 420. Privacy settings may include any number of attributes for a social network model. For example, business data attribute 412 is a description and business data attribute 414 is a time period. A checked attribute such as attribute 412 indicates that the attribute is not shared while a non-checked attribute such as attribute 414 indicates that the attribute is shared. In some embodiments, a checked attribute is shared and a non-checked attribute is not shared. Thus, checking or non-checking is merely an indication of whether or not an attribute is shared and should not be construed as limiting. In some embodiments, recommended privacy settings 420 include checked attributes such as attribute 422 which are not checked in current privacy settings. In some embodiments, recommended privacy settings 420 included non-checked attributes such as attribute 424 which are also non-checked in current privacy settings. In this manner, a user may quickly and easily determine which attributes have the same privacy settings between current and recommended privacy settings. In some embodiments, a user may select a subset of recommended privacy settings by checking or un-checking attributes on the UI.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for managing privacy settings for a social network using an electronic computing device, the method comprising:
    causing the electronic computing device to receive a triggering event on the social network; and
    causing the electronic computing device to determine a plurality of privacy indices in response to the triggering event, wherein
        the plurality of privacy indices correspond with at least one target user, wherein
        the plurality of privacy indices are normalized from a summation of a plurality of privacy scores, wherein
        the plurality of privacy scores are each derived from a sum of attribute scores, and wherein
        the sum of attribute scores are each derived from a weighted sensitivity value of an attribute and a user relationship distance value of a user and the target user, wherein the weighted sensitivity value represents a numeric representation of a sensitivity of the attribute to a user, and wherein the user relationship distance value represents a quantification of trust between the user and the target user.

2. The method of claim 1, further comprising:
    causing the electronic computing device to calculate a recommended privacy setting for the user based on the plurality of privacy indices, wherein the recommended privacy setting represents a highest privacy index of the plurality of privacy indices, and wherein the highest privacy index indicates a most secure privacy setting;
    causing the electronic computing device to display a current privacy setting for the user; and
    causing the electronic computing device to display the recommended privacy setting for the user.

3. The method of claim 2, further comprising:
- causing the electronic computing device to implement the recommended privacy setting if the user desires a higher privacy setting; and
- causing the electronic computing device to maintain the current privacy setting if the user does not desire the higher privacy setting.

4. The method of claim 1, wherein the triggering event may be selected from the following: the user creates a group . . . and the friend removes the user.

5. The method of claim 1, wherein the attribute may be selected from the following: a personal data attribute, a contact data attribute, an education data attribute, a business data attribute, a hobby data attribute, an interest data attribute, and a user relationship data attribute.

6. The method of claim 5, wherein each attribute is assigned the weighted sensitivity value based on a determination of a level of importance to the user.

7. The method of claim 1, wherein the user relationship distance value is defined by a relationship, which may be selected from the following: a close friend relationship, a friend relationship, a friend of a friend relationship, an acquaintance relationship, a group relationship, and a network relationship.

8. The method of claim 2, further comprising:
- modifying the current privacy setting to add a subset of the recommended privacy setting.

9. A computing device program product for managing privacy settings for a social network using a computing device, the computing device program product comprising:
- a non-transitory computer readable medium;
- first programmatic instructions for receiving a triggering event; and
- second programmatic instructions for determining a plurality of privacy indices in response to the triggering event, wherein
  - the plurality of privacy indices correspond with at least one target user, wherein
  - the plurality of privacy indices are normalized from a summation of a plurality of privacy scores, wherein
  - the plurality of privacy scores are each derived from a sum of attribute scores, and wherein
  - the sum of attribute scores are each derived from a weighted sensitivity value of an attribute and a user relationship distance value of a user and the target user, wherein the weighted sensitivity value represents a numeric representation of a sensitivity of the attribute to a user, wherein the user relationship distance value represents a quantification of trust between the user and the target user, and wherein the programmatic instructions are stored on the computer readable storage medium.

10. The computing device program product of claim 9, further comprising:
- third programmatic instructions for calculating a recommended privacy setting for the user based on the plurality of privacy indices, wherein the recommended privacy setting represents a highest privacy index of the plurality of privacy indices, wherein the highest privacy index indicates a most secure privacy setting;
- fourth programmatic instructions for displaying a current privacy setting for the user;
- fifth programmatic instructions for displaying the recommended privacy setting for the user;
- sixth programmatic instructions for implementing the recommended privacy setting if the user desires a higher privacy setting; and
- seventh programmatic instructions for maintaining the current privacy setting if the user does not desire the higher privacy setting.

11. The computing device program product of claim 9, wherein the triggering event may be selected from the following: the user creates a group . . . and the friend removes the user.

12. The computing device program product of claim 9, wherein the attribute may be selected from the following: a personal data attribute, a contact data attribute, an education data attribute, a business data attribute, a hobby data attribute, an interest data attribute, and a user relationship data attribute.

13. The computing device program product of claim 9, wherein the user relationship distance value is defined by a relationship, which may be selected from the following: a close friend relationship, a friend relationship, a friend of a friend relationship, an acquaintance relationship, a group relationship, and a network relationship.

14. The computing device program product of claim 10, further comprising:
- eighth programmatic instructions for modifying the current privacy setting to add a subset of the recommended privacy setting.

15. A privacy manager having a privacy recommendation component for managing privacy settings for a social network, the privacy manager comprising:
- a privacy score calculator module for determining a plurality of privacy indices in response to the triggering event, wherein
  - the plurality of privacy indices are normalized from a summation of a plurality of privacy scores, wherein
  - the plurality of privacy scores are each derived from a sum of attribute scores, wherein
  - the sum of attribute scores are each derived from a weighted sensitivity value of an attribute and a user relationship distance value of a user and the target user, and wherein
  - the weighted sensitivity value represents a numeric representation of a sensitivity of the attribute to a user;
- a privacy enforcer module for managing conflicts associated with accepting the privacy recommendation;
- a privacy model module for managing a user relationship, the user relationship utilized for defining a user relationship distance value, wherein the user relationship distance value represents a quantification of trust between the user and the target user; and
- a privacy elections module for designating the user relationship between a user and a target.

16. The privacy manager of claim 15, wherein
the privacy manager is configured to communicate with a models component, the models component configured to display the privacy settings within the social network, and wherein
the privacy manager is further configured to communicate with a plurality of controllers, the controllers configured for interfacing the privacy manager with a user interface and the models component.

17. The privacy manager of claim 16, wherein the privacy manager is further configured to access a repository, the repository configured for storing non-transient data associated with the privacy manager.

18. The privacy manager of claim 15, wherein the privacy manager is enabled over an application server, wherein the application server is in electronic communication with the social network.

* * * * *

UNITED STATES PATENT AND TRADEMARK OFFICE
CERTIFICATE OF CORRECTION

| | | |
|---|---|---|
| PATENT NO. | : 8,234,688 B2 | Page 1 of 1 |
| APPLICATION NO. | : 12/418511 | |
| DATED | : July 31, 2012 | |
| INVENTOR(S) | : Tyrone W. A. Grandison et al. | |

It is certified that error appears in the above-identified patent and that said Letters Patent is hereby corrected as shown below:

Title Page, Item (75) Inventors name should read "Michael Maximilien".

Signed and Sealed this
Twelfth Day of February, 2013

Teresa Stanek Rea
*Acting Director of the United States Patent and Trademark Office*